(12) United States Patent
Boday et al.

(10) Patent No.: US 10,066,105 B2
(45) Date of Patent: Sep. 4, 2018

(54) RENEWABLE SELF-HEALING CAPSULE SYSTEM

(71) Applicant: International Business Machines Corporation, Armonk, NY (US)

(72) Inventors: Dylan J. Boday, Tucson, AZ (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/098,446

(22) Filed: Apr. 14, 2016

(65) Prior Publication Data
US 2016/0230006 A1    Aug. 11, 2016

Related U.S. Application Data

(62) Division of application No. 13/732,738, filed on Jan. 2, 2013.

(51) Int. Cl.
| | |
|---|---|
| *C11C 3/00* | (2006.01) |
| *B01J 13/14* | (2006.01) |
| *C08L 89/00* | (2006.01) |
| *B01J 13/08* | (2006.01) |
| *B01J 13/10* | (2006.01) |

(52) U.S. Cl.
CPC ............... *C08L 89/00* (2013.01); *B01J 13/08* (2013.01); *B01J 13/10* (2013.01); *B01J 13/14* (2013.01); *C11C 3/00* (2013.01)

(58) Field of Classification Search
None
See application file for complete search history.

(56) References Cited

U.S. PATENT DOCUMENTS

| | | | | |
|---|---|---|---|---|
| 3,567,650 | A * | 3/1971 | Bakan ...................... | A61K 9/50 264/4 |
| 3,743,604 | A * | 7/1973 | Schnoring ................ | B01J 13/10 106/409 |
| 4,729,791 | A * | 3/1988 | Laura ....................... | C09D 5/08 106/14.23 |
| 5,268,286 | A | 12/1993 | Kobayashi et al. | |
| 5,292,533 | A | 3/1994 | McMahon et al. | |

(Continued)

FOREIGN PATENT DOCUMENTS

| | | |
|---|---|---|
| DE | 1122495 B1 | 6/1954 |
| GB | 1029732 | 5/1966 |

OTHER PUBLICATIONS

Anderson et al., "Toughening Polylactide", Polymer Reviews, 2008, vol. 48, pp. 85-108, (Received Apr. 25, 2007, Accepted Oct. 15, 2007, First Published Feb. 15, 2008), © Taylor & Francis Group, LLC. DOI: 10.1080/15583720701834216.

(Continued)

*Primary Examiner* — Jeffrey Washville
(74) *Attorney, Agent, or Firm* — Nathan M. Rau

(57) ABSTRACT

A renewable material for releasing a self-healing agent includes a renewable polymeric substrate with capsules and a reactant dispersed in the renewable polymeric substrate. The capsules may be formed from a first renewable shell polymer and may enclose the renewable self-healing agent. The reactant may be suitable for reacting with the renewable self-healing agent to form a polymer.

10 Claims, 2 Drawing Sheets

(56) References Cited

U.S. PATENT DOCUMENTS

| | | | |
|---|---|---|---|
| 5,378,413 A * | 1/1995 | Mihm | A01N 25/28 264/4.3 |
| 6,669,962 B2 | 12/2003 | Fanta et al. | |
| 7,799,849 B2 | 9/2010 | Raravikar et al. | |
| 8,003,288 B2 | 8/2011 | De Jong et al. | |
| 8,080,318 B2 | 12/2011 | De Jong et al. | |
| 2006/0281834 A1 | 12/2006 | Lee et al. | |
| 2007/0269566 A1 | 11/2007 | Curtis et al. | |
| 2008/0152815 A1 | 6/2008 | Stephenson et al. | |
| 2008/0299391 A1 | 12/2008 | White et al. | |
| 2009/0036568 A1 | 2/2009 | Merle et al. | |
| 2010/0083873 A1 | 4/2010 | Oxley | |
| 2012/0207921 A1 * | 8/2012 | Calle | B01J 13/14 427/140 |

OTHER PUBLICATIONS

Blaiszik et al., "Microcapsules Filled with Reactive Solutions for Self-Healing Materials", Polymer 50 (2009) pp. 990-997, (Received Oct. 1, 2008, Revised Dec. 18, 2008, Accepted Dec. 22, 2008, Published Online Dec. 27, 2008), © 2008 Elsevier Ltd. DOI: 10.1016/j.polymer.2008.12.040.

Coxsworth, "Scientist Developing Self-Healing Biorenewable Polymers", Gizmag, Jan. 11, 2011, 4 pages, www.gizmag.com/scientist-developing-self-healing-biorenewable-polymers/17551/.

Gandini, A., "Polymers from Renewable Resources: A Challenge for the Future of Macromolecular Materials", Macromolecules, vol. 41, No. 24, pp. 9491-9501, 2008, (Received Jul. 30, 2008, Revised Sep. 4, 2008, Published Online Oct. 14, 2008), © 2008 American Chemical Society, Washington, D.C. DOI: 10.10211ma801735u.

Na et al., "Biodegradable Microcapsules Prepared by Self-Healing of Porous Microspheres", ACS Macro Letters, pp. 697-700, (Received Dec. 14, 2011, Accepted May 14, 2012), © American Chemical Society, dx.doi.org/10.1021/mz200222d.

Boday, et al, "Renewable Self-Healing Capsule System", U.S. Appl. No. 13/732,738, filed Jan. 2, 2013.

* cited by examiner

RENEWABLE SELF-HEALING CAPSULE SYSTEM

TECHNICAL FIELD

This invention relates to the field of self-healing materials. More particularly, it relates to renewable self-healing agents encapsulated by a renewable polymer.

BACKGROUND

Polymeric materials are used in many applications, including paints, upholstery, pipes, and circuit boards. Polymeric materials can undergo degradation due to a number of factors, including heat, chemicals, and mechanical forces.

SUMMARY

In one embodiment, a renewable self-healing material includes a renewable polymeric substrate with capsules and a reactant dispersed in the renewable polymeric substrate. The capsules may be formed from a first renewable shell polymer and enclose the renewable self-healing agent. The reactant may be suitable for reacting with the renewable self-healing agent to form a polymer.

In another embodiment, a method for creating a renewable self-healing material includes creating a microemulsion having a continuous phase and a first dispersed phase, wherein the continuous phase includes a first renewable shell polymer and a first solvent, and the first dispersed phase includes a renewable self-healing agent. The solubility of the first renewable shell polymer in the continuous phase is decreased to form a second dispersed phase, wherein the second dispersed phase has a higher concentration of the first shell polymer than the continuous phase. A capsule is formed around the first dispersed phase, wherein the capsule contains the first renewable shell polymer. The capsule and a reactant are dispersed into a renewable polymeric substrate, wherein the reactant is suitable for reacting with the renewable self-healing agent to form a polymer.

BRIEF DESCRIPTION OF THE DRAWINGS

Embodiments are illustrated by way of example, and not by way of limitation, in the figures of the accompanying drawings in which reference numerals refer to similar elements.

DETAILED DESCRIPTION

Polymeric materials can undergo degradation due to a number of factors, including heat, chemicals, and mechanical forces. One result of polymer degradation is cracking of the polymer. Cracking may occur throughout the polymeric material, both on the outside surface where the cracks may be visually detected, and on the inside surface where cracks may go unseen. These cracks can lead to equipment failure in circuit boards, fluid piping systems, and other applications with polymeric materials. One solution to this cracking is to use self-healing capsules in the polymer that may autonomically heal the polymer upon crack formation and capsule rupture.

Many plastics and polymers are derived from petroleum sources. Industry has been moving away from petroleum products, and many polymers such as polylatic acid (PLA) are created from renewable sources. It may be desired for marketing or "green energy" requirements for these renewable polymers, or "biopolymers," to contain renewable materials throughout the polymer. Conventional self-healing materials do not use renewable self-healing mechanisms for biopolymers.

According to embodiments of the invention, a biopolymer may contain renewable self-healing capsules which may assist in healing the biopolymer upon a crack. Renewable materials are any materials that may be generated from biological or natural processes, and the term "renewable" refers to the property of the item discussed as having been generated through biological or natural processes. The renewable self-healing capsules may include a polymer shell encapsulating the self-healing agent made from renewable materials. The renewable self-healing capsules may be formed through coacervation.

Self-Healing Mechanism

According to embodiments of the invention, the mechanism for a renewable self-healing material involves a self-healing agent and a catalyst capable of initiating polymerization of the self-healing agent. The self-healing agent may be a renewable monomer or polymer enclosed in a renewable capsule that may react with a reactant to form a polymeric network that fills the crack. The reactant and the capsules containing the renewable self-healing agent are dispersed in a polymeric material. When a crack forms in the polymeric material, the crack may rupture a capsule, causing the self-healing agent contained in the capsule to flow into the crack. After the self-healing agent flows into the crack, it may contact the reactant and form a polymeric network, filling the crack.

Figure 1:
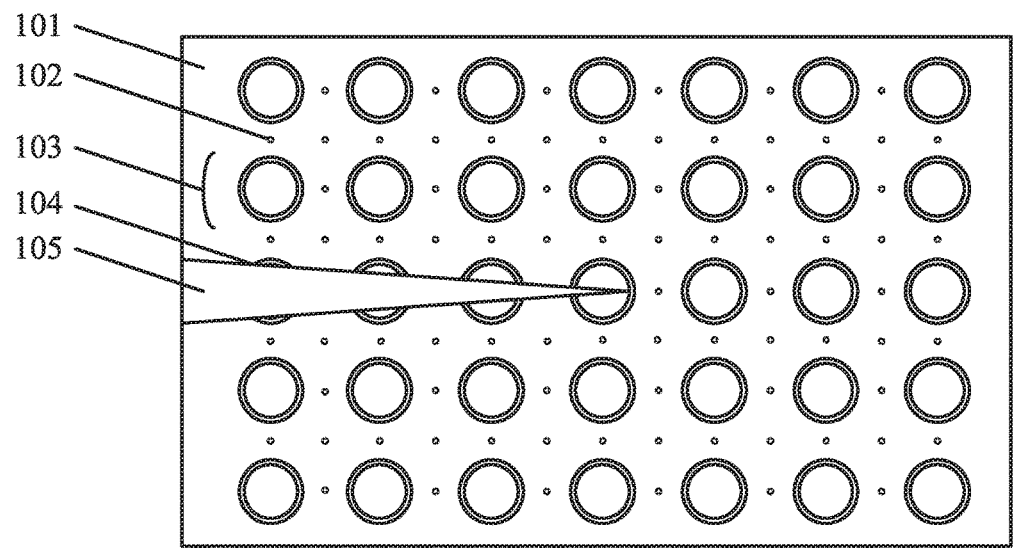
FIG. 1 represents a two dimensional cross-sectional representation of a crack in a polymeric material having reactant and renewable capsules that contain a renewable self-healing agent, according to embodiments of the invention.

FIG. 1 represents a two dimensional cross-sectional representation of a crack in a polymeric material having a reactant and capsules that contain a renewable self-healing agent, according to embodiments of the invention. Capsules 103 containing a renewable self-healing agent and reactant particles 102 are dispersed into a polymer 101. When a crack 105 forms, it may create a capsule rupture 104, causing the renewable self-healing agent to flow into the crack 105. The self-healing agent may react with a reactant particle 102, polymerize, and seal the crack 105.

The self-healing mechanism works with a wide variety of reactants and renewable monomers and polymers. Renewable self-healing agents may be chosen for their chemical and physical properties, such as low melting point or viscosity, or the surrounding polymeric material's properties, such as residual functionality, depending on the intended application and material conditions. Renewable self-healing agents that may be used include, but are not limited to, triglycerides, functionalized vegetable oils such as epoxidized soybean oil, corn oil, and linseed oil. The renewable self-healing agents may have functional groups attached so that they more easily polymerize or create a stronger polymeric network. Functional groups that may be used include, but are not limited to, epoxies, acrylates, and hydroxyls. Reactants may be selected for their ability to react with the renewable self-healing agent and form a polymer. The reactants that may be used include, but are not limited to, amines, citric acid, and Lewis acids. In an alternative embodiment of the invention, at least some of the capsules contain a reactant which may rupture due to crack formation, with the reactants encapsulated through the same method as discussed below.

In an embodiment of the invention, the renewable self-healing agent is epoxidized soybean oil and the reactant is an amine, such as a primary amine. Soybean oils are high production commercial oils, as soybeans are the second most produced crop in the United States. Soybean oil is highly unsaturated, which makes them more easily functionalized. The epoxidized soybean oil may act as an epoxy resin that reacts with an amine to form a polymeric network. Amine-curing of epoxies is a thermosetting reaction that results in a resistive polymer and may occur under a variety of conditions, making a system of amine-cured epoxidized soybean oil ideal for renewable polymers used in most environments. The reaction between epoxidized soybean oil and an amine may be as follows:

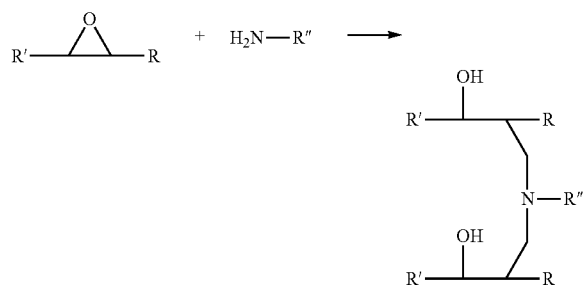

where R and R' are parts of the triglyceride chains of the epoxidized soybean oil and R" is a side group of a primary amine.

Capsule Structure and Formation

According to embodiments of the invention, the self-healing capsules may be formed through coacervation. Coacervation involves deposition of a colloid at the interface of a dispersed phase and a continuous phase to form a microcapsule. A self-healing agent may be dispersed into a polymer solution and emulsified to form a microemulsion having a dispersed phase of self-healing agent droplets and a continuous phase of the polymer solution. The emulsification may be achieved through agitation, sonication, or other mechanical method. The polymer solution may contain a renewable shell polymer in a solvent such as water, where the renewable shell polymer may form part of the capsule wall of the self-healing capsules. Renewable shell polymers that may be used include, but are not limited to, collagen, starch, gum arabic, gelatin, dextrin, cellulose, and casein. More than one shell polymer may be used to form the capsule wall, such as starch-gum arabic.

The solubility of the shell polymer in the continuous phase is reduced through a solubility reduction event and a large part of the shell polymer separates from solution to form a new polymer-rich phase. The solubility reduction event may involve addition of an incompatible polymer (complex coacervation), non-solvent, or acid to the polymer solution, a temperature or pH change, or a combination of these events. The polymer-rich phase may coat the self-healing agent and deposit around the self-healing agent of the dispersed phase as a continuous shell. Deposition may occur when the polymer is adsorbed at the interface between the dispersed phase of self-healing agent and continuous phase of the polymer-rich phase. The polymer coating may be reinforced through the addition of a renewable cross-linking agent. Renewable cross-linking agents that may be used include, but are not limited to, gluteraldehyde and transglutaminase.

Figure 2:
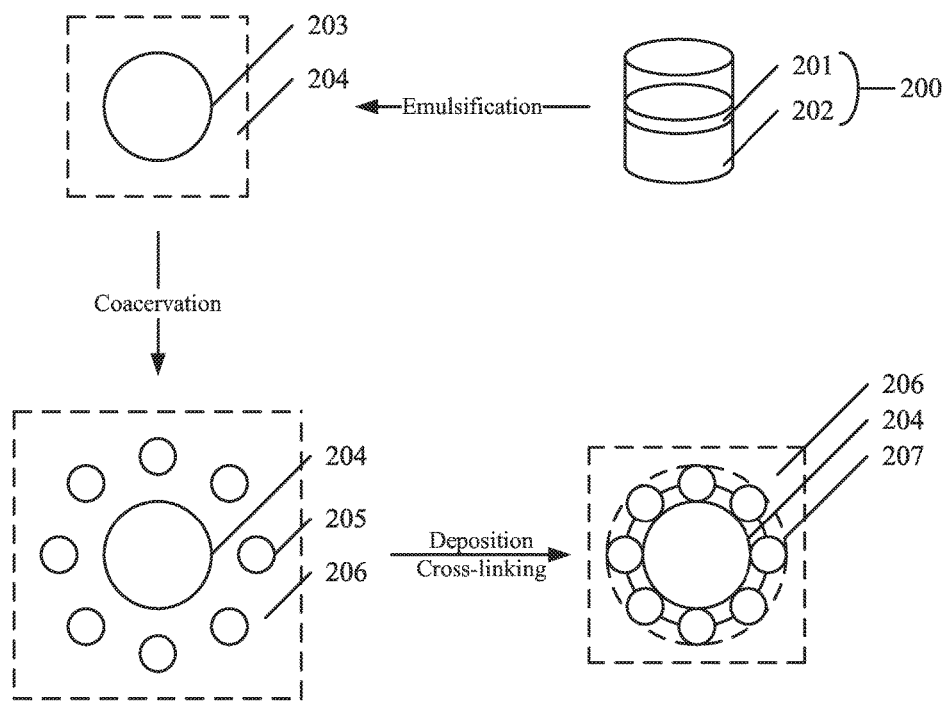
FIG. 2 depicts capsule formation through coacervation, according to embodiments of the invention.

FIG. 2 depicts capsule formation through coacervation, according to embodiments of the invention. A mixture 200 contains a layer of self-healing agent 201 and a layer of polymer solution 202. The polymer solution 202 contains a shell polymer in a solvent. The self-healing agent 201 and the polymer solution 202 are emulsified to form a dispersed phase of self-healing agent 203 and a continuous phase of polymer solution 204. A reduction event reduces the solubility of the shell polymer in the continuous phase of polymer solution 204 and causes it to form a polymer-rich phase 205 and a solvent-rich phase 206. The polymer-rich phase 205 coalesces and deposits around the dispersed phase of self-healing agent 204 to form a polymer coating 207. This polymer coating 207 may be further cross-linked through the addition of a cross-linking agent.

In an embodiment of the invention, the renewable shell polymers are gum arabic and starch, the self-healing agent is epoxidized soybean oil, and the solvent is water. The capsule wall is formed through complex coacervation, in which the solubility reduction event involves addition of an immiscible, oppositely charged polymer such as gelatin, and reduction of pH through addition of a weak acid. After addition of the oppositely-charged polymer, the gum arabic and starch coalesce and form a coating around the epoxidized soybean oil. The renewable shell polymers of the coating are further cross-linked with gluteraldehyde. The capsules may be washed and separated for dispersion into a biopolymer.

The self-healing capsules may be controlled for size, both for the capsule and the capsule shell. The thickness of the capsule shell may be controlled by the concentration of the renewable shell polymers, the temperature of coacervation, and length of time the coacervation and settling out of the polymer-rich phase is allowed to continue, as well as other general factors dictating physico-chemical processes. It may be desirable to have a thinner capsule wall, depending on the properties of the polymeric substrate into which the self-healing capsule is dispersed or the application of the polymeric substrate. For example, the capsules may be from 2-1000 microns thick, depending on factors such as the properties and application of the surrounding polymeric material.

Renewable Polymeric Substrate

Once the self-healing capsules are formed, they may be dispersed into a renewable polymeric substrate. The renewable self-healing capsules may be incorporated into a variety of renewable polymeric substrates. The polymeric substrate may be formed from renewable monomers and polymers which include, but are not limited to, sugars such as starch, vegetable oils such as soybean oil, lignin, cellulose, suberin, terpenes, tannins, furans, and acid monomers such as citric acid and tartaric acid. The polymeric substrates may be formed by any suitable method, including step growth polymerization and chain growth polymerization such as cationic polymerization.

The self-healing capsules may be dispersed into the polymeric substrate through any suitable method of dispersion and polymer formation, such as colloidal dispersions. In an embodiment of the invention, the renewable self-healing capsules are dispersed into a solution of renewable monomers, after which polymerization of the renewable monomer solution is initiated. The reactant may be dispersed into the polymeric substrate in a variety of ways, including capsules, particles, or bound to the polymeric substrate. The reactant may be encapsulated through the same mechanism as the self-healing agent. The amount of capsules is empirically determined based on the rheology of the polymeric substrate, the capsule size, and the amount of self-healing agent and reactant needed to reach the desired self-healing probability.

EXPERIMENTAL PROTOCOLS

The following illustrative experimental protocols are prophetic examples which may be practiced in a laboratory environment.
Formation of Self-Healing Capsule Through Coacervation; Epoxidized Soybean Oil, Gum Arabic/Starch/Gelatin Shell A first aqueous solution containing 2-10 wt % gum arabic and 2-10 wt % starch is stirred for 15 minutes at 40° C. A second aqueous solution containing 10-20 wt % gelatin is stirred for 15 minutes at 40° C. The first aqueous solution is emulsified with epoxidized soybean oil by mechanical agitation for 5 minutes. The second aqueous solution is added to the agitated emulsion and the pH is lowered to 4 using 1M citric acid. The resulting solution is cooled to 5° C. for 30 minutes with continuous mechanical agitation. The pH is raised to 9 under continuous agitation to form the encapsulated epoxidized soybean particles. The particles are concentrated by centrifugation, decanted, and spray dried.

What is claimed is:

1. A method for creating a renewable self-healing material, comprising:
   creating a microemulsion having a continuous phase and a first dispersed phase, wherein the continuous phase includes a first renewable shell polymer and a first solvent, and the first dispersed phase includes a renewable self-healing agent, wherein the renewable self-healing agent is a functionalized vegetable oil;
   decreasing the solubility of the first renewable shell polymer in the continuous phase to form a second dispersed phase, wherein the second dispersed phase has a higher concentration of the first renewable shell polymer than the continuous phase, wherein decreasing the solubility causes capsules to form, each capsule having a shell of the first renewable shell polymer surrounding a core of the renewable self-healing agent; and
   dispersing the each capsule and a renewable reactant selected from a group consisting of an amine and a Lewis acid into a renewable polymeric substrate, wherein the renewable reactant is suitable for reacting with the renewable self-healing agent to form a polymer.

2. The method of claim 1, wherein the first renewable shell polymer is from a group consisting of collagen, starch, gum arabic, gelatin, dextrin, cellulose, and casein.

3. The method of claim 1, wherein the renewable polymeric substrate is from a group consisting of sugars, vegetable oils, lignin, cellulose, suberin, citric acid, and tartaric acid.

4. The method of claim 1, wherein decreasing the solubility involves an action from a group consisting of changing the pH of the microemulsion, changing a temperature of the microemulsion, adding a reduction polymer with a charge opposite of the first shell polymer to the microemulsion, and adding a non-solvent to the microemulsion.

5. The method of claim 1, wherein
   the functionalized vegetable oil is from a group consisting of soybean oil, corn oil, and linseed oil, and
   the functional group is from a group consisting of epoxy, acrylate, and hydroxyl.

6. The method of claim 5, wherein the renewable self-healing agent is epoxidized soybean oil and the reactant is an amine.

7. The method of claim 1, wherein forming a capsule around the first dispersed phase of self-healing agent further comprises depositing the first renewable shell polymer onto the renewable self-healing agent in the first dispersed phase.

8. The method of claim 7, wherein forming a capsule around the first dispersed phase of self-healing agent further comprising cross-linking the first renewable shell polymer with a cross-linking agent.

9. The method of claim 1, further comprising:
   creating the microemulsion wherein the continuous phase further includes a second renewable shell polymer;
   decreasing the solubility of the second renewable shell polymer to form part of the second dispersed phase, wherein the second dispersed phase has a higher concentration of the second renewable shell polymer than the continuous phase; and
   forming the capsule around the first dispersed phase of self-healing agent, wherein the capsule further contains the second renewable shell polymer.

10. The method of claim 9, wherein:
    the first renewable shell polymer is starch;
    the second renewable shell polymer is gum arabic;
    the renewable self-healing agent is epoxidized soybean oil;
    the reactant is an amine;
    forming the capsule around the first dispersed phase further comprising cross-linking the first renewable shell polymer and the second renewable shell polymer with glutaraldehyde; and
    decreasing the solubility of the first renewable shell polymer and the second renewable shell polymer involves adding a gelatin to the microemulsion.

* * * * *